United States Patent
Yamaguchi

(10) Patent No.: US 8,553,756 B2
(45) Date of Patent: Oct. 8, 2013

(54) DATA TRANSMISSION SYSTEM AND METHOD, AND DATA SENDING APPARATUS AND RECEIVING APPARATUS

(75) Inventor: Hiroshi Yamaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 380 days.

(21) Appl. No.: 12/891,914

(22) Filed: Sep. 28, 2010

(65) Prior Publication Data
US 2011/0075722 A1   Mar. 31, 2011

(30) Foreign Application Priority Data
Sep. 30, 2009   (JP) ............................... P2009-226607

(51) Int. Cl.
*H03K 7/04* (2006.01)
*H03D 3/24* (2006.01)
(52) U.S. Cl.
USPC ......................................... 375/238; 375/376
(58) Field of Classification Search
USPC ................. 375/238, 233, 239, 340, 359, 376; 365/233, 239; 327/156
See application file for complete search history.

(56) References Cited

U.S. PATENT DOCUMENTS

| | | | | |
|---|---|---|---|---|
| 2005/0138504 A1* | 6/2005 | Kanbayashi | ................. | 714/724 |
| 2006/0176089 A1* | 8/2006 | Yamane et al. | ................. | 327/156 |
| 2010/0215134 A1* | 8/2010 | Sato | .............................. | 375/359 |

FOREIGN PATENT DOCUMENTS

| | | |
|---|---|---|
| JP | S56-152346 A | 11/1981 |
| JP | S62-177764 A | 8/1987 |
| JP | H08-125703 A | 5/1996 |
| JP | 2003-174484 A | 6/2003 |
| JP | 3719413 A | 11/2005 |
| JP | H09-036923 A | 2/2007 |

OTHER PUBLICATIONS

JP office action referencing above-identified foreign references, in JP counterpart patent application 2009-226607, dated Aug. 20, 2013.

* cited by examiner

*Primary Examiner* — Khai Tran

(57) ABSTRACT

A data transmission system including a device that delays a signal having a predetermined base frequency so as to generate a reference-phase signal having a reference phase, a delay signal more delayed than the reference signal by a unit of time, and an advance signal more advanced than the reference signal by the unit of time; a device that selects one of the reference-phase, delay, and advance signals so as to output a data signal in which a phase of one of the rising and falling edges of the data signal varies in accordance with values of transmitted data, and a phase of the other of the edges is constant; a device that generates a reference signal at the timing of one of the rising and falling edges of the data signal, said one having the constant phase; and a device that reproduces the data by measuring a phase difference between the generated reference signal and the data signal at the timing of the other of the rising and falling edges which has the varying phase.

8 Claims, 15 Drawing Sheets

(12)US 8,553,756 B2

DATA TRANSMISSION SYSTEM AND METHOD, AND DATA SENDING APPARATUS AND RECEIVING APPARATUS

Priority is claimed on Japanese Patent Application No. 2009-226607, filed Sep. 30, 2009, the contents of which are incorporated herein by reference.

BACKGROUND OF THE INVENTION

1. Field of the Invention

The present invention relates to a data transmission system, a corresponding method, a data sending apparatus, and a data receiving apparatus, and in particular, relates to those for performing high-speed transmission by effectively using a band of a transmission path between information processing apparatuses.

2. Description of the Related Art

Japanese patent No. 3,719,413 (Patent Document 1) proposes a technique by which a signal phase includes information so as to enlarge a noise margin and implement high-frequency transmission. The relevant high-frequency transmission technique will be explained below.

FIG. 17 is a block diagram of a data transmission system disclosed as a first embodiment in Patent Document 1. In FIG. 17, a data sending apparatus 1 has delay circuits 11 and 12, and multiplexers 13 and 14.

The delay circuit 11 delays a signal CLK, which is supplied from an external device and has a base frequency, by a unit of time, and outputs the delayed signal.

The delay circuit 12 has a delaying time twice as much as that provided by the delay circuit 11, so that it delays the signal CLK by twice the unit of time, and outputs the delayed signal.

The multiplexer 13 always selects the signal output from the delay circuit 11, and outputs the selected signal as a reference signal REF. The multiplexer 13 is used for capturing the time required for the processing of the multiplexer 14, and for synchronizing with the signal output from the multiplexer 14.

The multiplexer 14 selects one of the signal CLK or the signal output from the delay circuit 12 based on data DIN, and outputs the selected signal as a signal DATA.

As shown in FIG. 18, the signal CLK and the signal output from the delay circuit 12 are input into the multiplexer 14. As shown in FIG. 19, when data DIN has a value of "0", the signal CLK is selected and output as transmission data DATA. When data DIN has a value of "1", the signal output from the delay circuit 12 is selected and output as the transmission data DATA.

When data DIN has a value of "0", the phase of the transmission data DATA is more advanced than the reference signal REF by the unit of time. When data DIN has a value of "1", the phase of the transmission data DATA is more delayed than the reference signal REF by the unit of time.

In accordance with the above structure, the reference signal REF and the transmission data DATA are output from the data sending apparatus 1.

In FIG. 17, a data receiving apparatus, into which the reference signal REF and the transmission data DATA are input, has a phase comparator 21, and an RS latch 22.

The phase comparator 21, into which the reference signal REF and the transmission data DATA are input, and detects a phase difference between the reference signal REF and the transmission data DATA. When the phase of the transmission data DATA is more advanced than the reference signal REF, a phase advance detection signal R having a pulse width corresponding to the phase difference is output. When the phase of the transmission data DATA is more delayed than the reference signal REF, a phase delay detection signal S having a pulse width corresponding to the phase difference is output.

That is, when the phase of the transmission data DATA is more advanced than the phase of the reference signal REF by the unit of time, the phase advance detection signal R having a pulse width corresponding to the unit of time is output. When the phase of the transmission data DATA is more delayed than the phase of the reference signal REF by the unit of time, the phase delay detection signal S having a pulse width corresponding to the unit of time is output.

The phase delay detection signal S and the phase advance detection signal R are input into the RS latch 22. When the phase advance detection signal R is applied to a reset input terminal, a data reproduction signal DOUT is set to the level "0". When the phase delay detection signal S is applied to the reset input terminal, a data reproduction signal DOUT is set to the level "1". The data reproduction signal DOUT is obtained as described above.

In the data transmission system as the first embodiment of Patent Document 1, the signal phase has information so as to enlarge the noise margin, thereby implementing high-frequency transmission. However, the first embodiment requires a dedicated transmission path for transmitting the reference signal REF as a reference for phase advance or delay of transmission data.

Accordingly, Patent Document 1 also discloses a third embodiment in which the reference signal REF as a reference for the phase advance or delay of transmission data is reproduced on the receiving side, so as to reduce the dedicated transmission path used for transmitting the reference signal REF.

That is, in the third embodiment of Patent Document 1, as shown in FIG. 20, a PLL (phase locked loop) circuit 20 is added to the data receiving apparatus 2, and the PLL circuit 20 generates the reference signal REF by using the transmission data DATA. Similar to the first embodiment of Patent Document 1, the reference signal REF generated by the PLL circuit 20 is input into a terminal of the phase comparator 21, and used as a reference in phase comparison for the transmission data DATA.

However, since the signal phase has information in the third embodiment of Patent Document 1, the relevant data has a large DC (direct current) component. Therefore, if the signal sign "0" or "1" continues for a long time, the control of the PLL circuit 20 is drawn by a phase corresponding to one of the two signs, so that the relevant data cannot be reproduced. Accordingly, in the third embodiment, in order that the time in which the signal sign "0" or "1" continues is sufficiently short in comparison with the response time of the PLL circuit 20, the data DIN applied to the multiplexer 14 should be encoded so as to include no DC component, and to satisfy a condition such that the time in which the signal sign "0" or "1" continues is sufficiently short in comparison with the response time of the PLL circuit 20.

In order to satisfy such restrictions, when the relevant data is encoded using an encoding method (e.g., 8B/10B encoding) by which "0" or "1" continues within a limited time, and is transmitted, the number of bits of the transmission data increases, which also increases the relevant latency.

SUMMARY OF THE INVENTION

In light of the above circumstances, an object of the present invention is to provide a data transmission system, a corresponding method, a data sending apparatus, and a data receiving apparatus, which require no dedicated transmission path for transmitting the reference signal, and enables high-frequency transmission without specific restriction on the data encoding.

Therefore, the present invention provides a data transmission system comprising:

a device that delays a signal having a predetermined base frequency so as to generate a reference-phase signal having a reference phase, a delay signal which is more delayed than the reference signal by a predetermined unit of time, and an advance signal which is more advanced than the reference signal by the unit of time;

a device that selects one of the reference-phase signal, the delay signal, and the advance signal so as to output a data signal in which a phase of one of the rising edge and the falling edge of the data signal varies in accordance with values of transmitted data, and a phase of the other of the rising and falling edges is constant;

a device that generates a reference signal at the timing of one of the rising edge and the falling edge of the data signal, said one having the constant phase; and a device that reproduces the data by measuring a phase difference between the generated reference signal and the data signal at the timing of the other of the rising and falling edges which has the varying phase.

The present invention also provides a data transmission method comprising:

a step that delays a signal having a predetermined base frequency so as to generate a reference-phase signal having a reference phase, a delay signal which is more delayed than the reference signal by a predetermined unit of time, and an advance signal which is more advanced than the reference signal by the unit of time;

a step that selects one of the reference-phase signal, the delay signal, and the advance signal so as to output a data signal in which a phase of one of the rising edge and the falling edge of the data signal varies in accordance with values of transmitted data, and a phase of the other of the rising and falling edges is constant;

a step that generates a reference signal at the timing of one of the rising edge and the falling edge of the data signal, said one having the constant phase; and a step that reproduces the data by measuring a phase difference between the generated reference signal and the data signal at the timing of the other of the rising and falling edges which has the varying phase.

The present invention also provides a data sending apparatus comprising:

a delay circuit that delays a signal having a predetermined base frequency so as to generate a reference-phase signal having a reference phase, a delay signal which is more delayed than the reference signal by a predetermined unit of time, and an advance signal which is more advanced than the reference signal by the unit of time; and a selector that selects one of the reference-phase signal, the delay signal, and the advance signal so as to output a data signal in which a phase of one of the rising edge and the falling edge of the data signal varies in accordance with values of transmitted data, and a phase of the other of the rising and falling edges is constant.

The present invention also provides a data receiving apparatus for receiving a data signal in which a phase of one of the rising edge and the falling edge of the data signal varies in accordance with values of data, and a phase of the other of the rising and falling edges is constant, the apparatus comprising:

a PLL circuit that generates a reference signal at the timing of one of the rising edge and the falling edge of the data signal, said one having the constant phase; and a data reproduction circuit that reproduces the data by measuring a phase difference between the generated reference signal and the data signal at the timing of the other of the rising and falling edges which has the varying phase.

In accordance with the present invention, a signal, whose phase of the rising (or falling) edge varies in accordance with input data, and whose phase of the falling (or rising) edge is constant, is output from the data sending apparatus. The PLL circuit of the data receiving apparatus generates a reference signal in synchronism with the falling (or rising) edge of the reception signal. Since the phase of the falling (or rising) edge of the signal from the data sending apparatus is constant regardless of the sign of the relevant data, the PLL circuit can always generate a stable reference signal for a continuity of any sign, so that no specific restriction is imposed on the method of encoding the relevant data.

DETAILED DESCRIPTION OF THE INVENTION

Hereinafter, embodiments of the present invention will be described with reference to the appended figures.

First Embodiment

Figure 1:
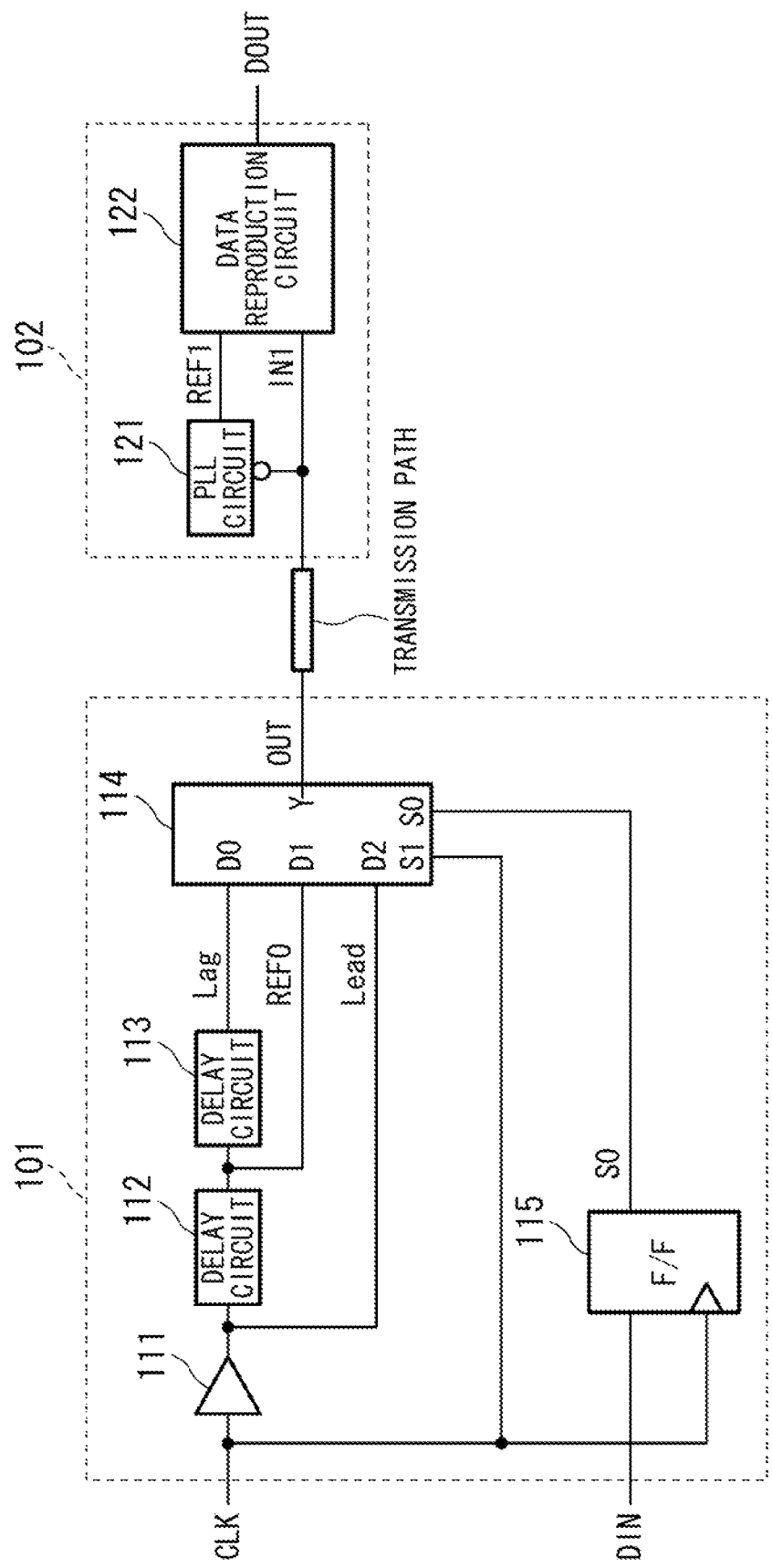
FIG. 1 is a block diagram showing a data transmission system in a first embodiment of the present invention.

FIG. 1 is a block diagram of a data transmission system in a first embodiment of the present invention. In FIG. 1, a data sending apparatus 101 has a buffer circuit 111, delay circuits 112 and 113, a selector 114, and a D flip-flop 115.

The buffer circuit 111 is used for timing control.

The delay circuits 112 and 113 each delay a signal CLK having a base frequency by a predetermined unit of time, and output the delayed signal.

A signal Lead output from the buffer circuit 111 is supplied to an input (terminal) D2 of the selector 114. A signal REF0 output from the delay circuit 112 is supplied to an input (terminal) D1 of the selector 114. A signal Lag output from the delay circuit 113 is supplied to an input (terminal) D0 of the selector 114.

The D flip-flop 115 captures the input data DIN at the rise timing of the signal CLK having the base frequency. A signal output from the D flip-flop 115 is supplied as a selection signal S0 to the selector 114. In addition, the signal CLK having the base frequency is supplied as a selection signal S1 to the selector 114.

The selector 114 selects and outputs one of the signal Lead from the buffer circuit 111, the signal REF0 from the delay circuit 112, and the signal Lag from the delay circuit 113.

Figure 2:
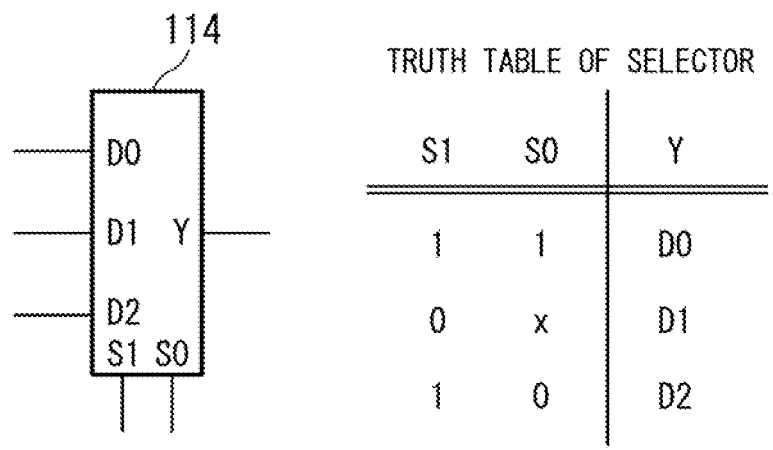
FIG. 2 is a diagram explaining a truth table of a selector in the data transmission system of the first embodiment.

FIG. 2 shows a truth table of the selector 114. As shown in FIG. 2, when the selection signal S1 is "1" and the selection signal S0 is "1", the input D0 (i.e., signal Lag) is selected. When the selection signal S1 is "0", the input D1 (i.e., signal REF0) is selected regardless of the value of the selection signal S0. When the selection signal S1 is "1" and the selection signal S0 is "0", the input D2 (i.e., signal Lead) is selected.

Figure 3:
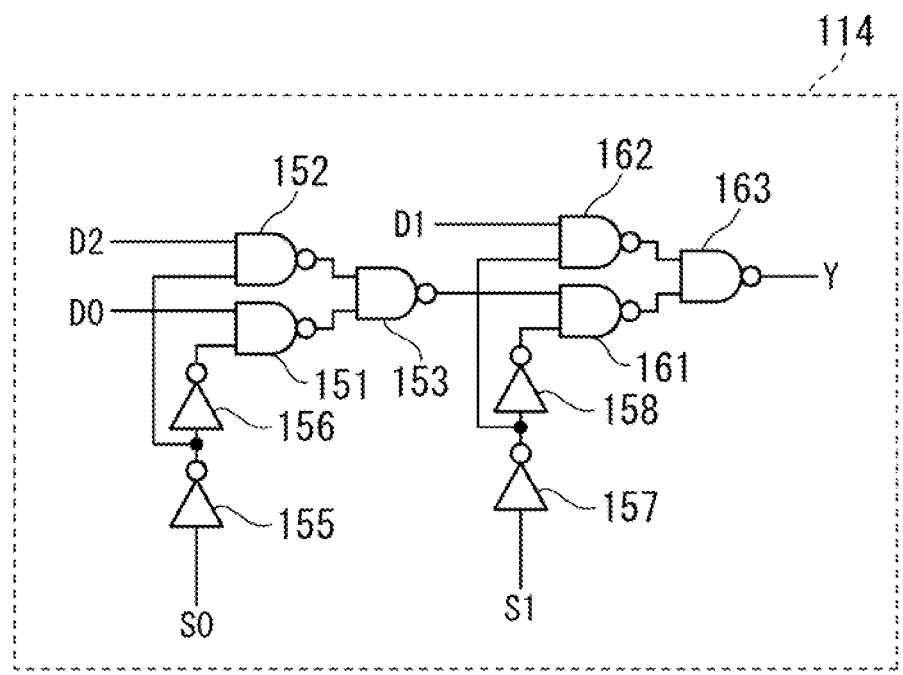
FIG. 3 is a diagram showing the structure of the selector in the data transmission system of the first embodiment.

FIG. 3 shows a concrete example of the selector 114. As shown in FIG. 3, the selector 114 is formed by connecting a selector consisting of NAND gates 151 to 153 and invertors 155 and 156, and a selector consisting of NAND gates 161 to 163 and invertors 157 and 158, in cascade.

The operation of the first embodiment will be explained with reference to FIG. 4. As shown in parts (A) and (B) in FIG. 4, the input data DIN and the signal CLK having the base frequency are input into the data sending apparatus 101.

As shown in part (C), the input data DIN is captured at the rise timing of the signal CLK. The signal (see part (C)) output from the D flip-flop 115 is supplied as the selection signal S0 to the selector 114. In addition, the signal (see part (B)) having the base frequency is supplied as the selection signal S1 to the selector 114.

As shown in FIG. 1, the buffer circuit 111, the delay circuit 112, and the delay circuit 113 are connected in cascade, and the signal CLK having the base frequency is supplied to the cascade connection. The buffer circuit 111 is a buffer used for timing adjustment. The buffer circuit 111 delays the signal CLK by time "ta", and outputs the delayed signal. The delay circuit 112 and the delay circuit 113 each delay the signal CLK by a unit time "tb", and output the delayed signal.

When the signal CLK having the base frequency is input at the timing as shown in part (B), the signal Lead from the buffer circuit 111 obtains the timing as shown in part (D), the signal REF0 from the delay circuit 112 obtains the timing as shown in part (E), and the signal Lag from the delay circuit 113 obtains the timing as shown in part (F). As shown in parts (D) to (F). Based on the signal REF0 as the reference signal from the delay circuit 112, the signal Lead from the buffer circuit 111 is more advanced by the unit time tb than the signal REF0, and the signal Lag from the delay circuit 113 is more delayed by the unit time tb than the signal REF0.

The selector 114 selects one of the signal Lead from the buffer circuit 111, the signal REF0 from the delay circuit 112, and the signal Lag from the delay circuit 113, and outputs a data output signal OUT in which the phase of the rising edge varies in accordance with the value of the data DIN, and the phase of the falling edge is constant. The data output signal OUT is sent to a data receiving apparatus 102.

Figure 4:
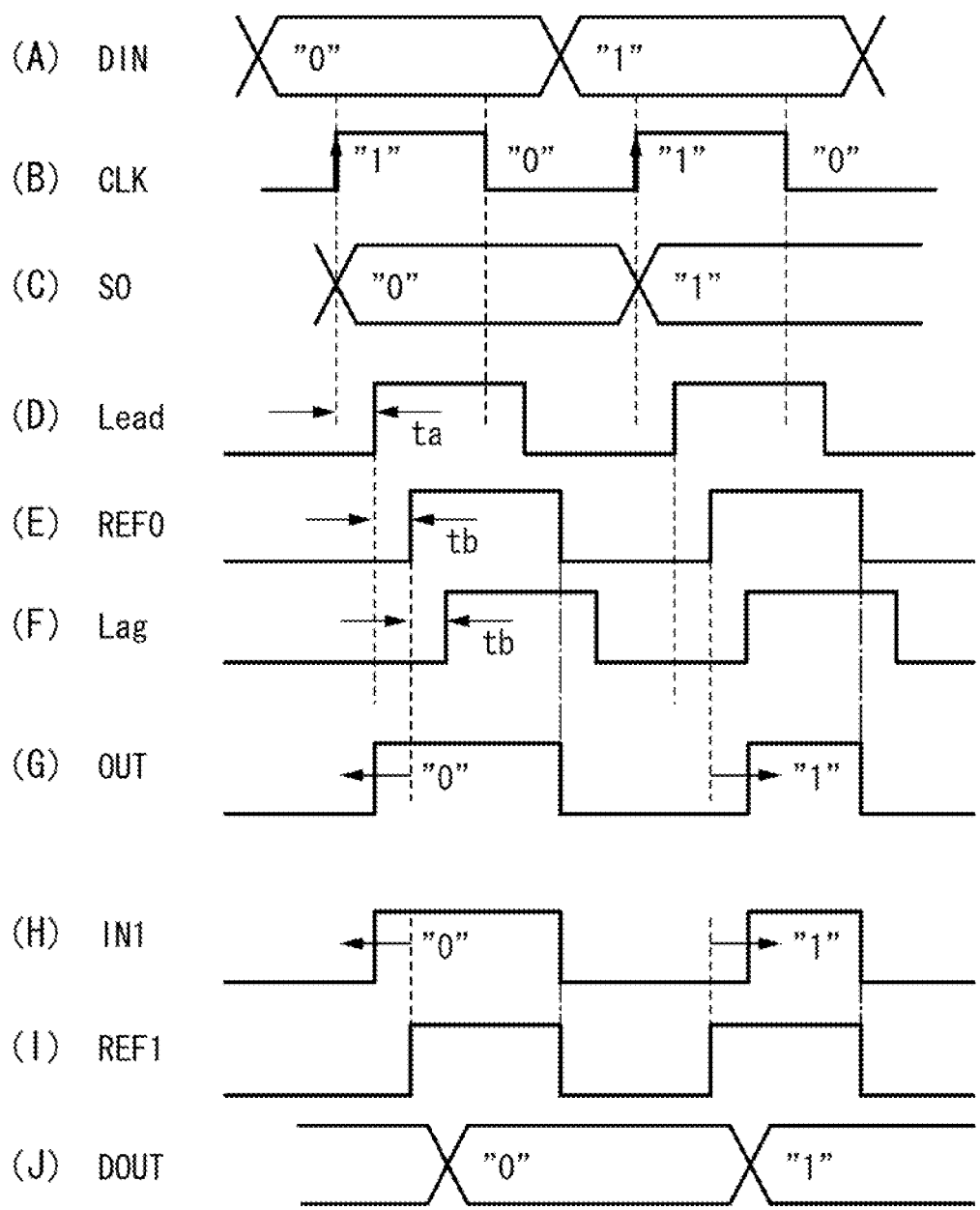
FIG. 4 is a timing chart for explaining the operation of the data transmission system of the first embodiment.

That is, when the input data DIN is "0", the selection signal S0 (see part (C) of FIG. 4) is set to "0" at the rising edge of the signal CLK. With reference to the truth table in FIG. 2, when the selection signal S0 is "0", the input (terminal) D2 (i.e., signal Lead) is selected if the selection signal S1 (see part (B)) is "1". Therefore, when the input data DIN is "0", the input D2 is being selected while the signal CLK is "1" starting from the rising edge of the signal CLK. Accordingly, the signal Lead (see part (D)) output from the buffer circuit 111 is output from the selector 114.

When the input data DIN is "0" and the signal CLK (i.e., signal S1) is set to "0", the input (terminal) D1 is selected (see the truth table in FIG. 2), and the signal REF0 (see part (E)) output from the delay circuit 112 is output from the selector 114. Therefore, when the input data DIN is "0", a signal (see part (G)) having the level "1" is being output from the rising edge of the signal Lead (see part (D)) output from the buffer circuit 111 to the falling edge of the signal REF0 (see part (E)) output from the delay circuit 112.

When the input data DIN is "1", the selection signal S0 (see part (C)) is set to "1" at the rising edge of the signal CLK. With reference to the truth table in FIG. 2, when the selection signal S0 is "1", the input (terminal) D0 (i.e., signal Lag) is selected if the selection signal S1 (see part (B)) is "1". Therefore, when the input data DIN is "1", the input D0 is being selected while the signal CLK (i.e., signal S1) is "1" starting from the rising edge of the signal CLK. Accordingly, the signal Lag (see part (F)) output from the delay circuit 113 is output from the selector 114.

When the input data DIN is "1" and the signal CLK (i.e., signal S1) is set to "0", the input D1 is selected (see the truth table in FIG. 2), and the signal REF0 (see part (E)) output from the delay circuit 112 is output from the selector 114. Therefore, when the input data DIN is "1", a signal (see part (G)) having the level "1" is being output from the rising edge of the signal Lag (see part (F)) output from the delay circuit 113 to the falling edge of the signal REF0 (see part (E)) output from the delay circuit 112.

As shown in part (G) in FIG. 4, the timing of the rising edge of the data output signal OUT is equal to (i) the timing of the rising edge of the signal Lead when the input data DIN is "0", and (ii) the timing of the rising edge of the signal Lag when the input data DIN is "1", that is, the rising edge of the data output signal OUT has a phase which varies based on the input data. In contrast, whether the input data DIN is "0" or "1", the falling edge of the data output signal OUT is equal to the timing of the falling edge of the signal REF0, and thus has a constant phase.

That is, (i) when the input data DIN is "0", the rising edge of the data output signal OUT is relatively advanced (i.e., has a phase of the rising edge of the signal Lead), (ii) when the input data DIN is "1", the rising edge of the data output signal OUT is relatively delayed (i.e., has a phase of the rising edge of the signal Lag), and (iii) whether the input data DIN is "0" or "1", the falling edge of the data output signal OUT does not vary (i.e., has a phase of the falling edge of the signal REF0).

Next, the data receiving apparatus 102 will be explained. As shown in FIG. 1, the data receiving apparatus 102 has a PLL circuit 121 and a data reproduction circuit 122.

The PLL circuit 121 generates a reference signal based on the rising edge of received data. The data reproduction circuit 122 measures a phase difference in the rising edge of the relevant data, and reproduces the data based on the phase difference.

A signal from the data sending apparatus 101 is transmitted to the data receiving apparatus 102. As shown in part (G) of FIG. 4, the selector 114 of the data sending apparatus 101 outputs the data output signal OUT whose phase of the rising edge varies in accordance with the input data DIN, and whose phase of the falling edge is constant. Therefore, a reception signal IN1 as shown in part (H) is input into the data receiving apparatus 102.

The PLL circuit 121 generates a reference signal REF1 (see part (I)) which is in synchronism with the falling edge of the reception signal IN1 and has a duty ratio of 50%. The reference signal REF1 is supplied to the data reproduction circuit 122.

The data reproduction circuit 122 measures the phase difference between the reception signal IN1 (see part (H)) and the reference signal REF1 (see part (I)) at the timing of the rising edge of the reference signal REF1. Accordingly, a data reproduction signal DOUT (see part (J)) is obtained from the data reproduction circuit 122.

As described above, in the first embodiment of the present invention, the data sending apparatus 101 outputs a signal whose phase of the rising edge varies in accordance with the input data DIN, and whose phase of the falling edge is constant. The PLL circuit 121 of the data receiving apparatus 102 generates the reference signal REF1 in synchronism with the falling edge of the reception signal IN1. Since the signal sent from the data sending apparatus 101 has the falling edge whose phase is constant regardless of the relevant data sign, the PLL circuit 121 can always generate a stable reference for continuation of any sign. Therefore, no restriction condition is applied to the method of encoding the data DIN.

Second Embodiment

Next, a second embodiment of the present invention will be explained in detail with reference to the drawings.

Figure 5:
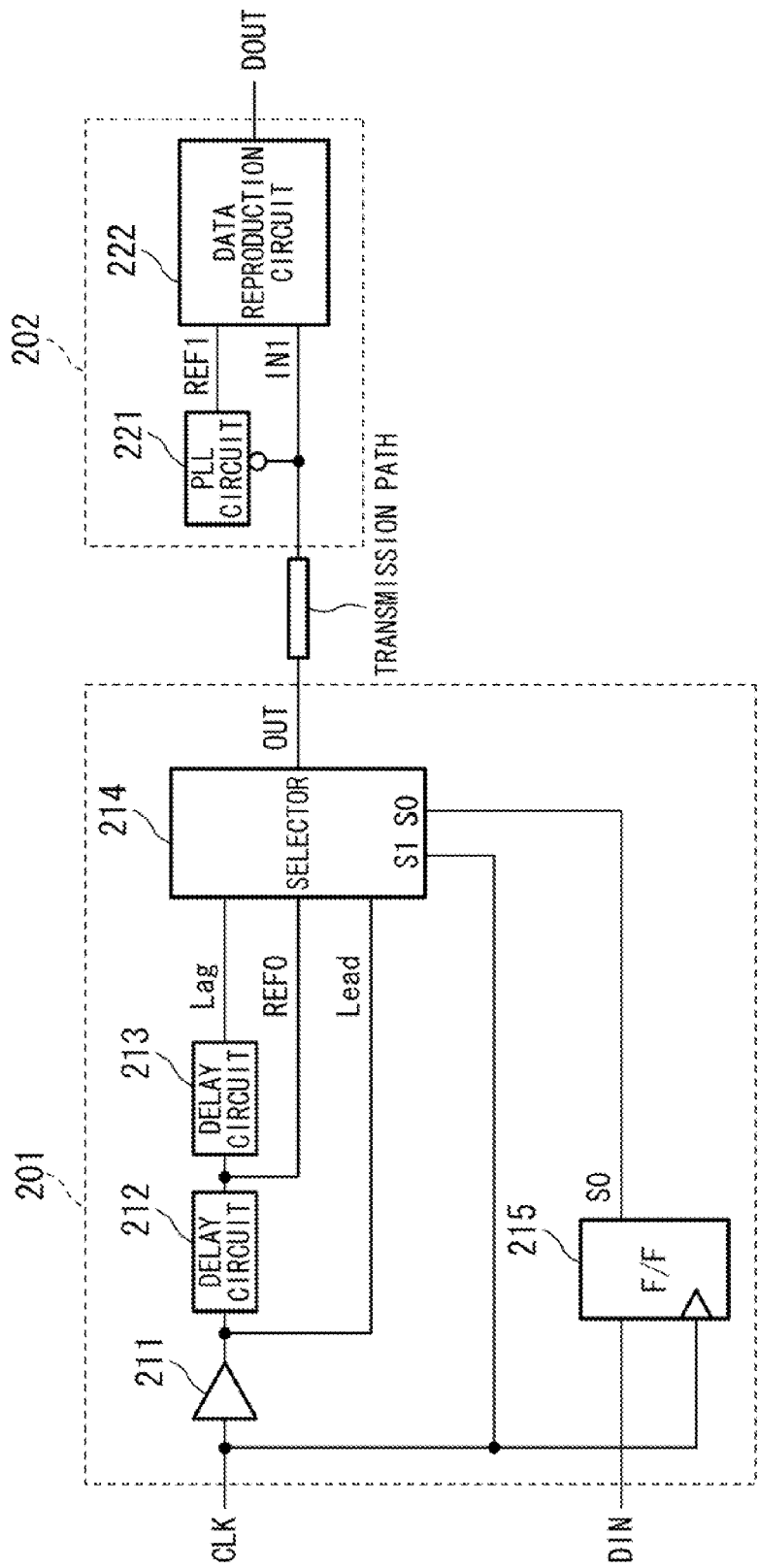
FIG. 5 is a block diagram showing a data transmission system in a second embodiment of the present invention.

FIG. 5 is a block diagram of the second embodiment which has a data sending apparatus 201 and a data receiving apparatus 202.

The data sending apparatus 201 has a buffer circuit 211, delay circuits 212 and 213, a selector 214, and a D flip-flop 215. The data receiving apparatus 202 has a PLL circuit 221 and a data reproduction circuit 222.

The first embodiment and the second embodiment have opposite sign and phase relationships for the levels "0" and "1" of the input data DIN and the data output signal OUT of the data sending apparatus.

That is, in the first embodiment, (i) when the input data DIN is "0", the rising edge of the data output signal OUT is relatively advanced, (ii) when the input data DIN is "1", the rising edge of the data output signal OUT is relatively delayed, and (iii) whether the input data DIN is "0" or "1", the falling edge of the data output signal OUT does not vary.

Figure 6:
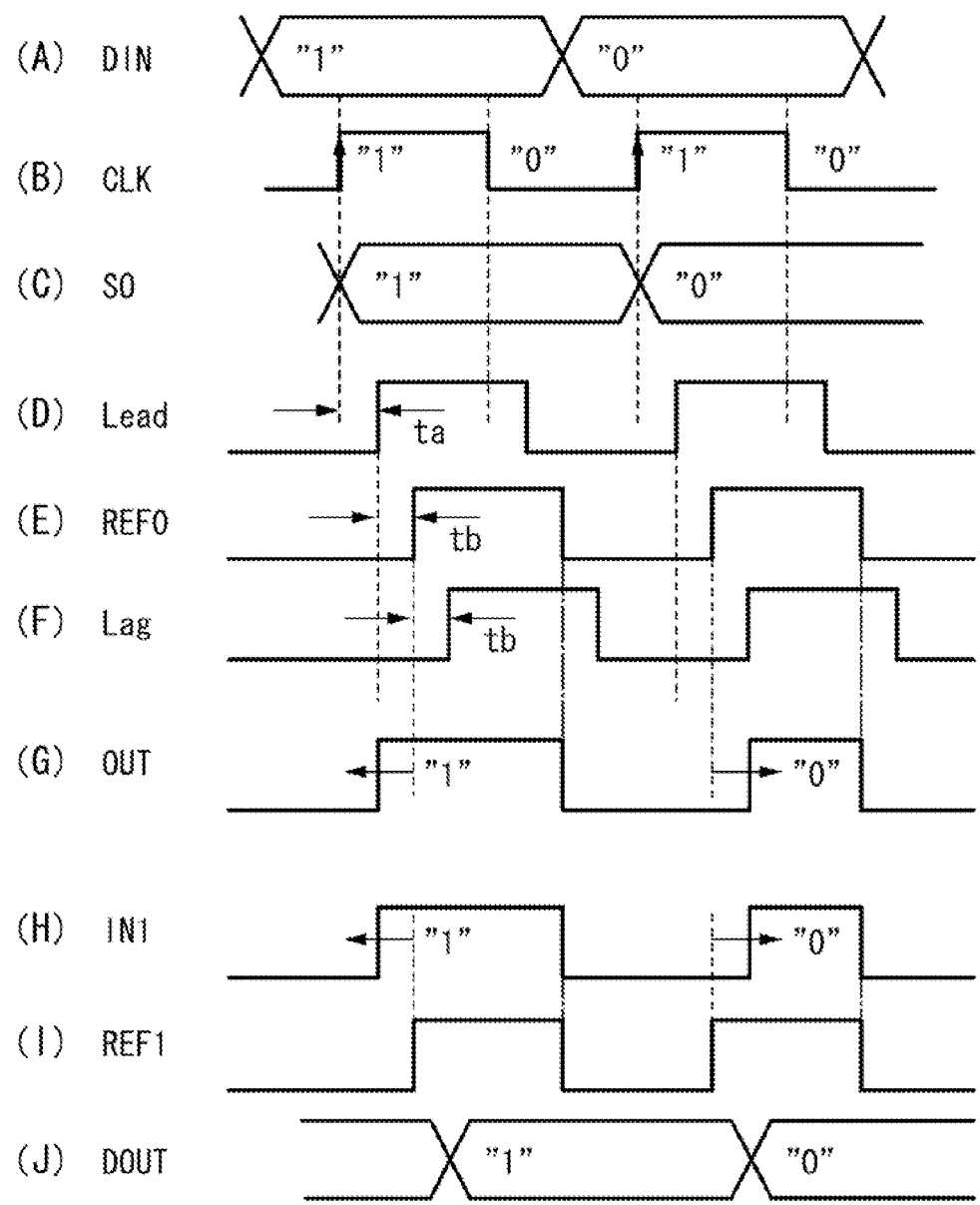
FIG. 6 is a timing chart for explaining the operation of the data transmission system of the second embodiment.

In contrast, in the second embodiment shown in FIG. 6, (i) when the input data DIN (see part (A) in FIG. 6)) is "1", the rising edge of the data output signal OUT (see part (G)) is relatively advanced, (ii) when the input data DIN is "0", the rising edge of the data output signal OUT is relatively delayed, and (iii) whether the input data DIN is "0" or "1", the falling edge of the data output signal OUT does not vary.

Figure 7:
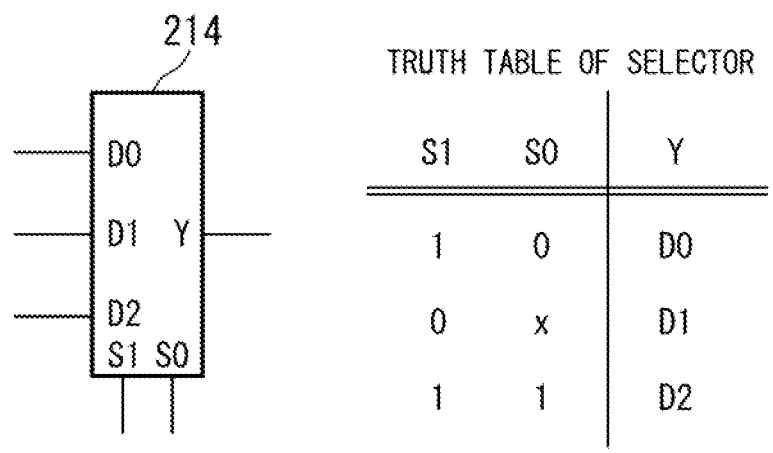
FIG. 7 is a diagram explaining a truth table of a selector in the data transmission system of the second embodiment.
Figure 8:
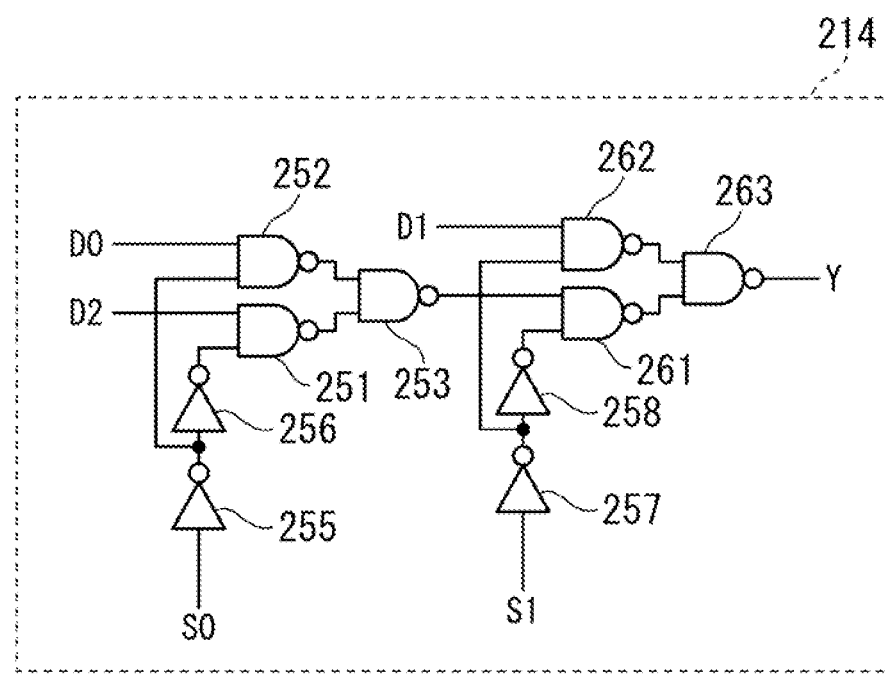
FIG. 8 is a diagram showing the structure of the selector in the data transmission system of the second embodiment.

In the second embodiment, a truth table shown in FIG. 7 is assigned to the selector 214. As shown in FIG. 8, such a selector 214 can be formed using NAND gates 251 to 253, NAND gates 261 to 263, invertors 255 and 256, and invertors 257 and 258. However, the selector 214 may have any other circuit structure which can satisfy the truth table shown in FIG. 7.

As the PLL circuit 221 of the data receiving apparatus 202, a circuit similar to the first embodiment is used, so as to generate the reference signal by using the falling edge of the reception data. As the data reproduction circuit 222, a device is used for measuring a phase difference in the rising edge of the relevant data and reproducing the data in accordance with the measured result, where the first embodiment and the second embodiment have opposite relationships for the phase and reproduced sign ("0" or "1").

Third Embodiment

Next, a third embodiment of the present invention will be explained in detail with reference to the drawings.

Figure 9:
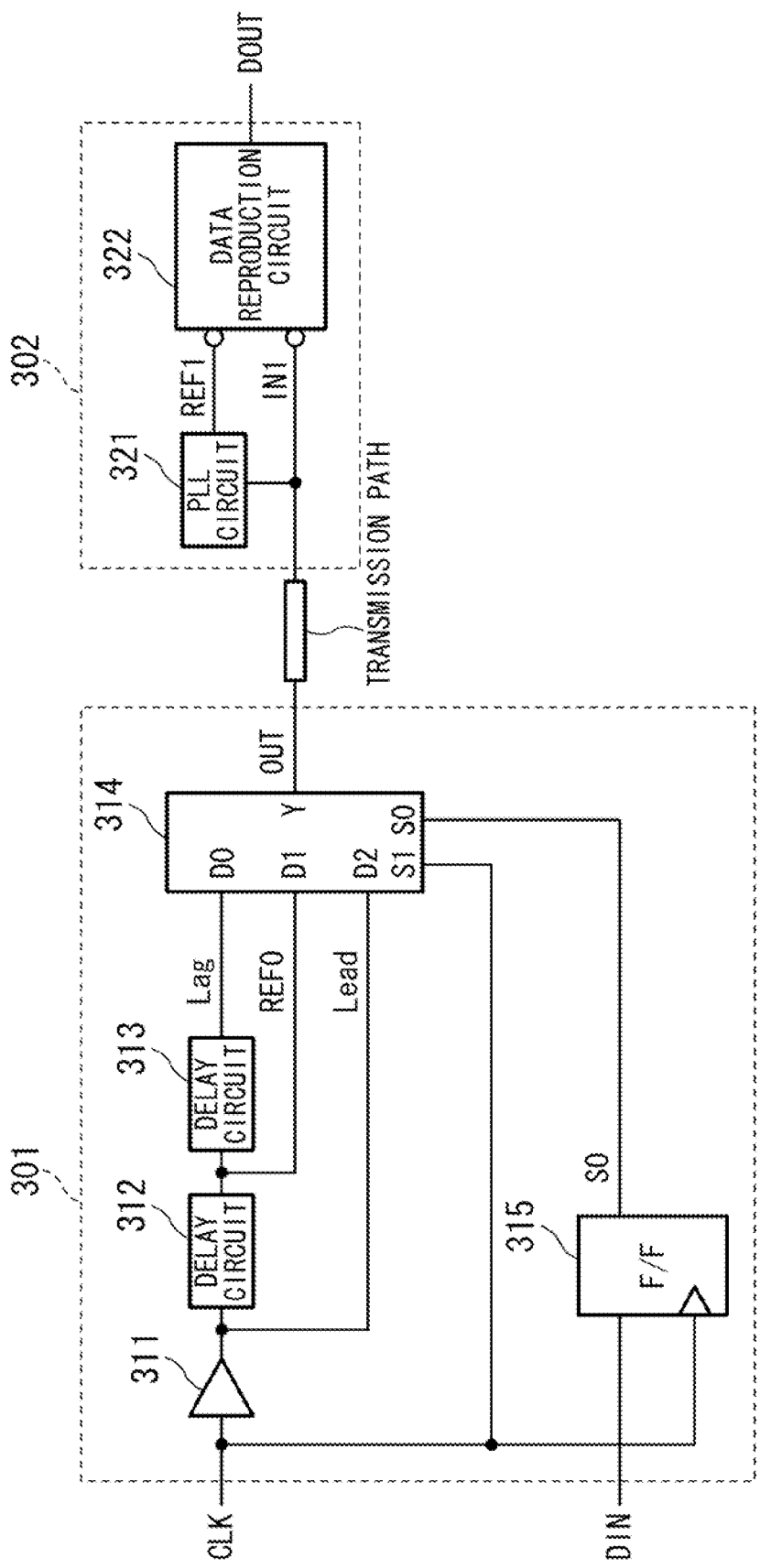
FIG. 9 is a block diagram showing a data transmission system in a third embodiment of the present invention.

FIG. 9 is a block diagram of the third embodiment which has a data sending apparatus 301 and a data receiving apparatus 302.

The data sending apparatus 301 has a buffer circuit 311, delay circuits 312 and 313, a selector 314, and a D flip-flop 315. The data receiving apparatus 302 has a PLL circuit 321 and a data reproduction circuit 322.

The first embodiment and the third embodiment have opposite relationships for the edge (of the data output signal OUT) at which the phase varies and the edge at which the phase is constant for the input signal DIN in the data sending apparatus.

That is, in the first embodiment, (i) when the input data DIN is "0", the rising edge of the data output signal OUT is relatively advanced, (ii) when the input data DIN is "1", the rising edge of the data output signal OUT is relatively delayed, and (iii) whether the input data DIN is "0" or "1", the falling edge of the data output signal OUT does not vary.

Figure 10:
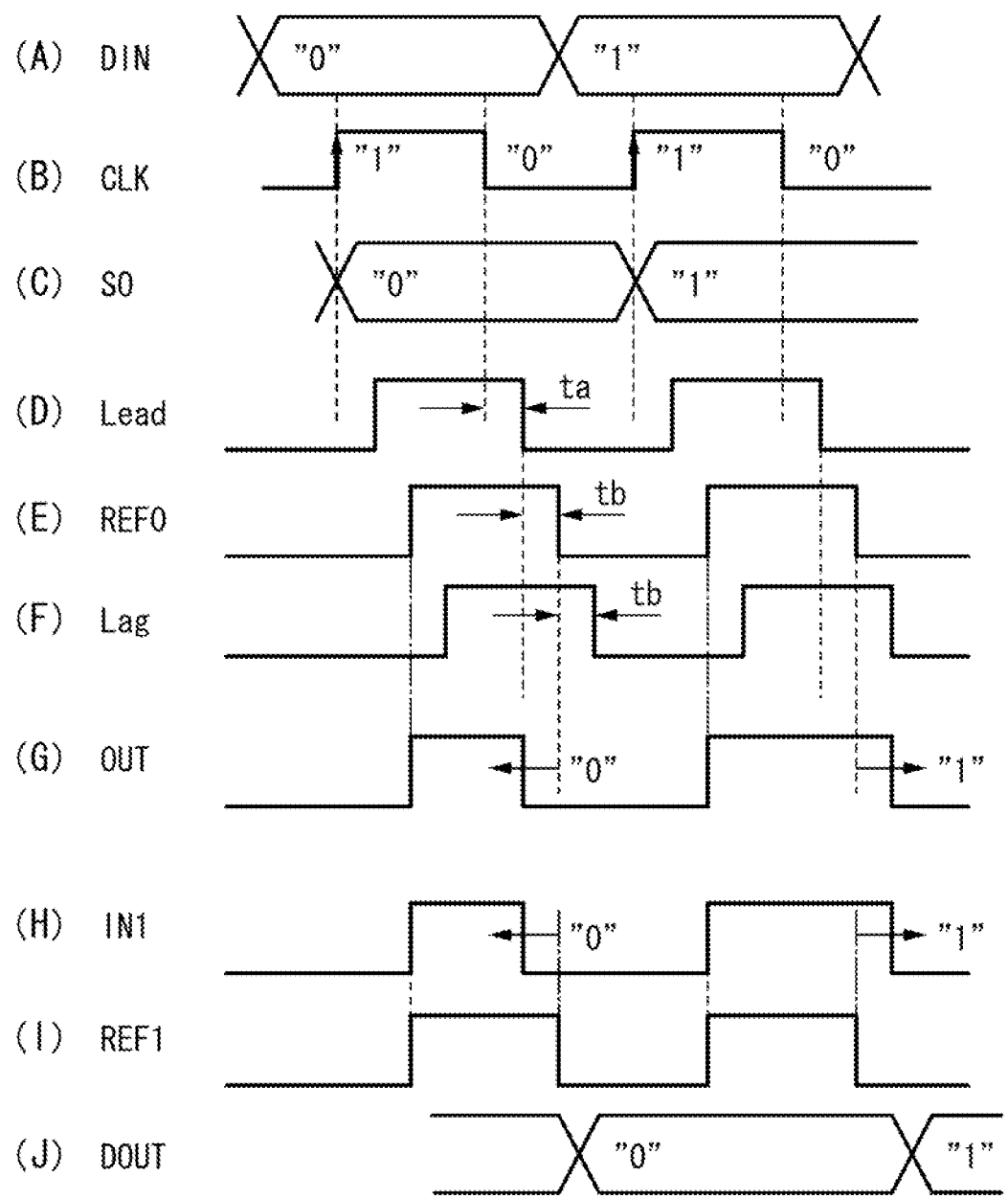
FIG. 10 is a timing chart for explaining the operation of the data transmission system of the third embodiment.

In contrast, in the third embodiment shown in FIG. 10, (i) when the input data DIN (see part (A) in FIG. 10)) is "0", the falling edge of the data output signal OUT (see part (G)) is relatively advanced, (ii) when the input data DIN is "1", the falling edge of the data output signal OUT is relatively delayed, and (iii) whether the input data DIN is "0" or "1", the rising edge of the data output signal OUT does not vary.

Figure 11:
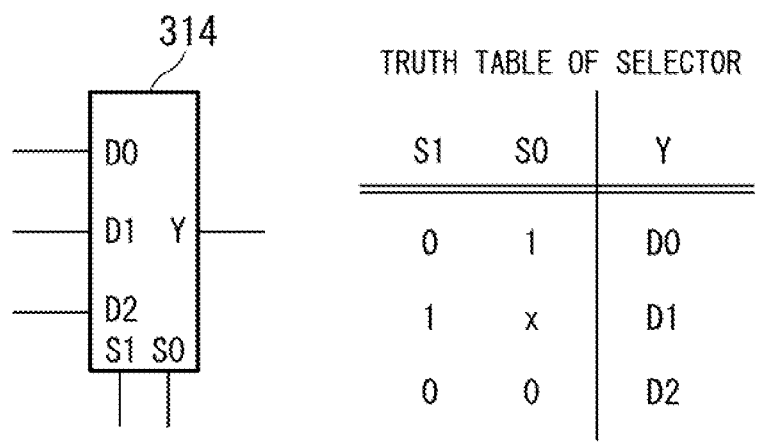
FIG. 11 is a diagram explaining a truth table of a selector in the data transmission system of the third embodiment.
Figure 12:
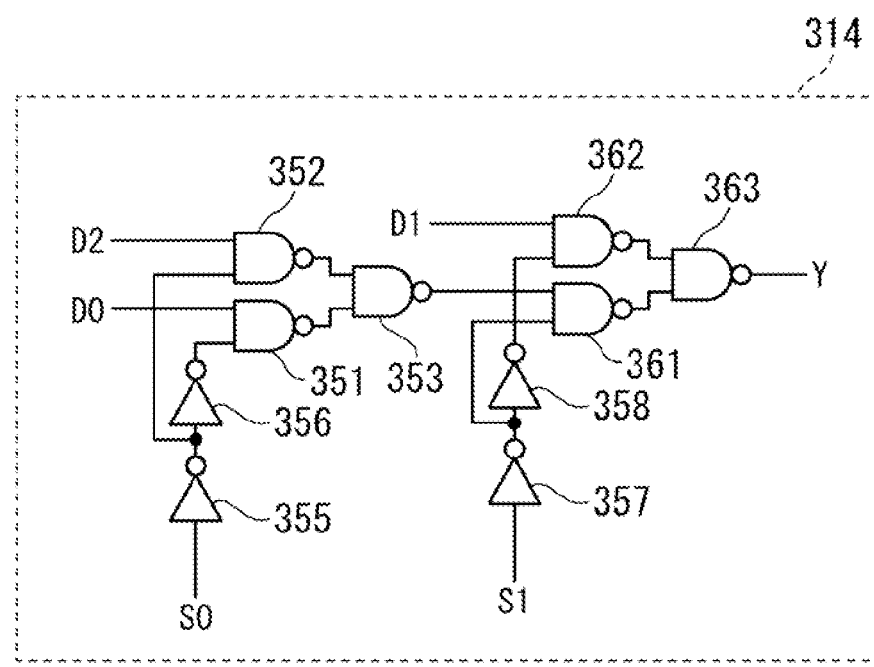
FIG. 12 is a diagram showing the structure of the selector in the data transmission system of the third embodiment.

In the third embodiment, a truth table shown in FIG. 11 is assigned to the selector 314. As shown in FIG. 12, such a selector 314 can be formed using NAND gates 351 to 353, NAND gates 361 to 363, invertors 355 and 356, and invertors 357 and 358. However, the selector 314 may have any other circuit structure which can satisfy the truth table shown in FIG. 11.

The PLL circuit 321 of the data receiving apparatus 302 generates the reference signal by using the rising edge of the reception data. The data reproduction circuit 322 measures a phase difference in the falling edge of the relevant data and reproduces the data in accordance with the measured result.

Fourth Embodiment

Next, a fourth embodiment of the present invention will be explained in detail with reference to the drawings.

Figure 13:
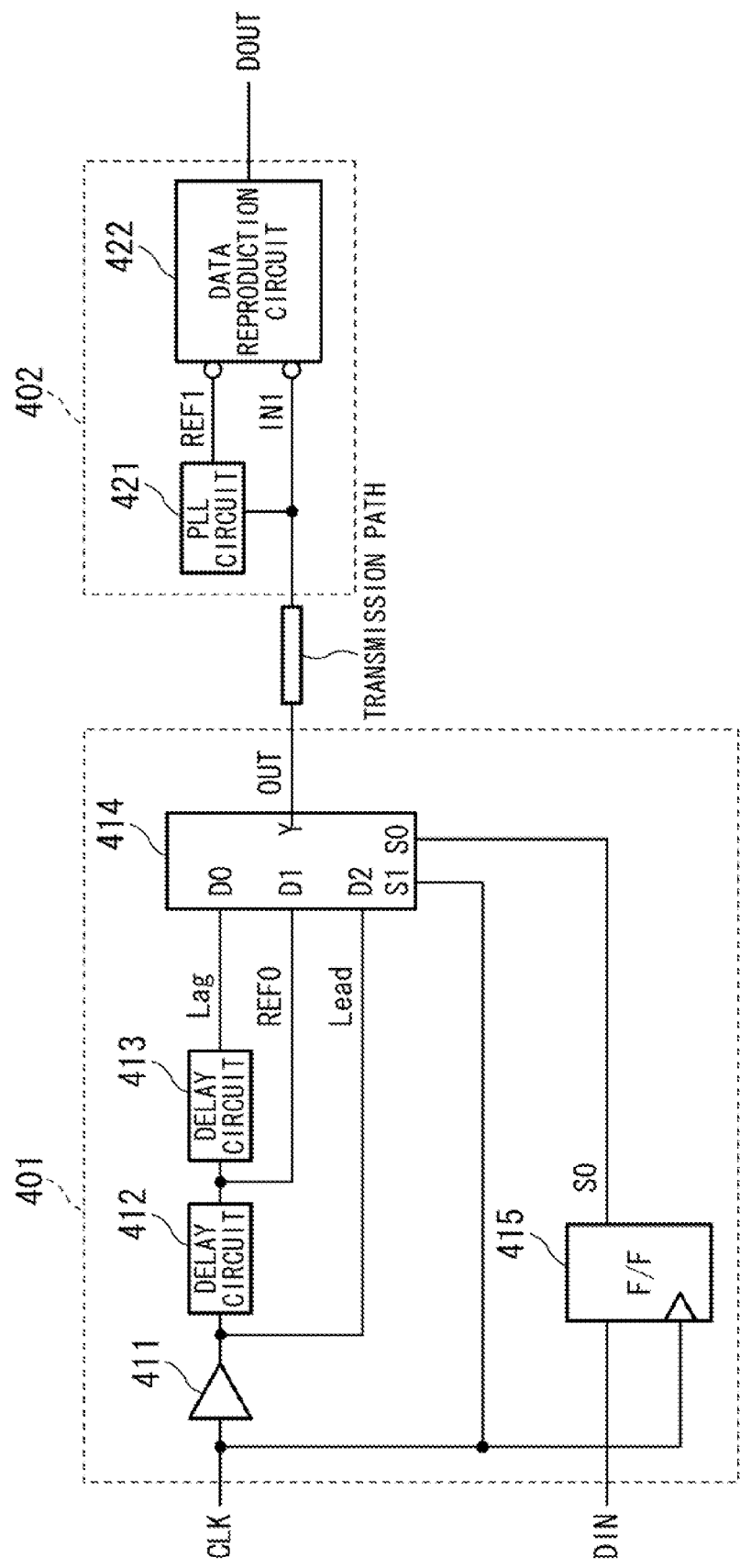
FIG. 13 is a block diagram showing a data transmission system in a fourth embodiment of the present invention.

FIG. 13 is a block diagram of the third embodiment which has a data sending apparatus 401 and a data receiving apparatus 402.

The data sending apparatus 401 has a buffer circuit 411, delay circuits 412 and 413, a selector 414, and a D flip-flop

415. The data receiving apparatus 402 has a PLL circuit 421 and a data reproduction circuit 422.

The third embodiment and the fourth embodiment have opposite sign and phase relationships for the levels "0" and "1" of the input data DIN and the data output signal OUT of the data sending apparatus.

That is, in the third embodiment, (i) when the input data DIN is "0", the falling edge of the data output signal OUT is relatively advanced, (ii) when the input data DIN is "1", the falling edge of the data output signal OUT is relatively delayed, and (iii) whether the input data DIN is "0" or "1", the rising edge of the data output signal OUT does not vary.

Figure 14:
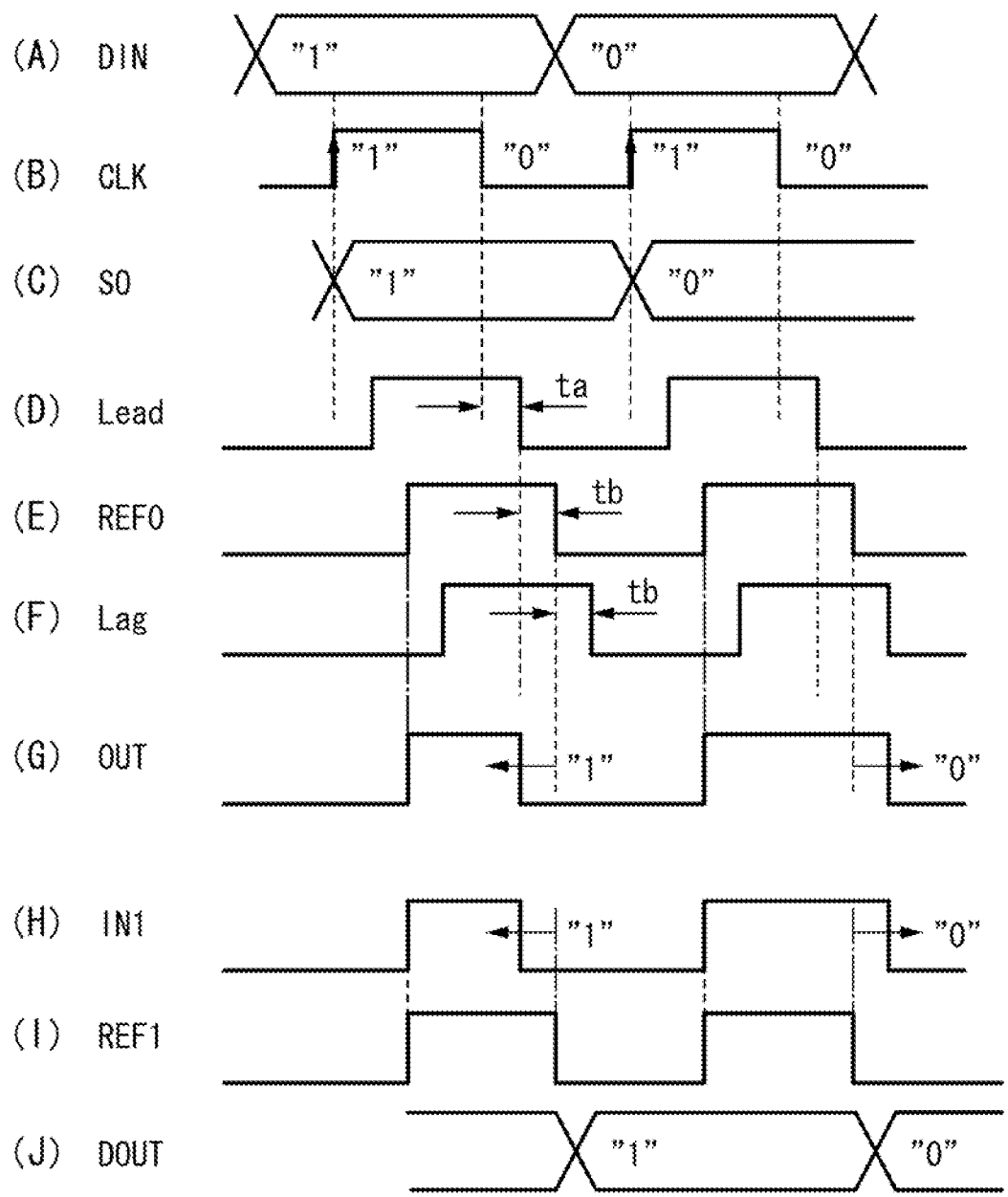
FIG. 14 is a timing chart for explaining the operation of the data transmission system of the fourth embodiment.

In contrast, in the fourth embodiment shown in FIG. 14, (i) when the input data DIN (see part (A) in FIG. 14)) is "1", the falling edge of the data output signal OUT (see part (G)) is relatively advanced, (ii) when the input data DIN is "0", the falling edge of the data output signal OUT is relatively delayed, and (iii) whether the input data DIN is "0" or "1", the rising edge of the data output signal OUT does not vary.

Figure 15:
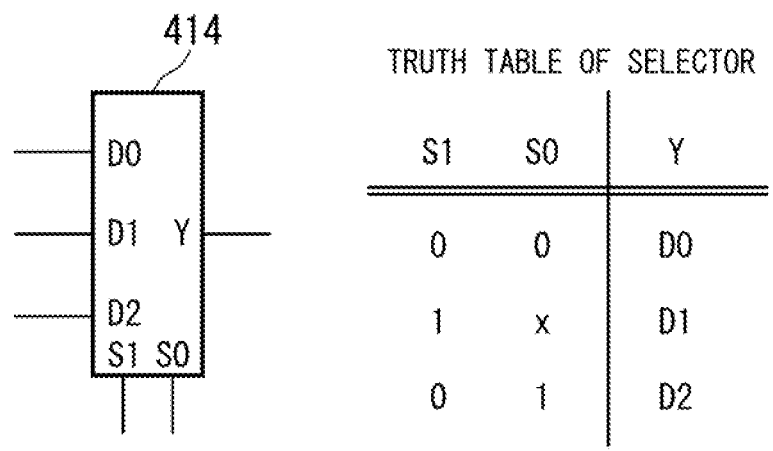
FIG. 15 is a diagram explaining a truth table of a selector in the data transmission system of the fourth embodiment.
Figure 16:
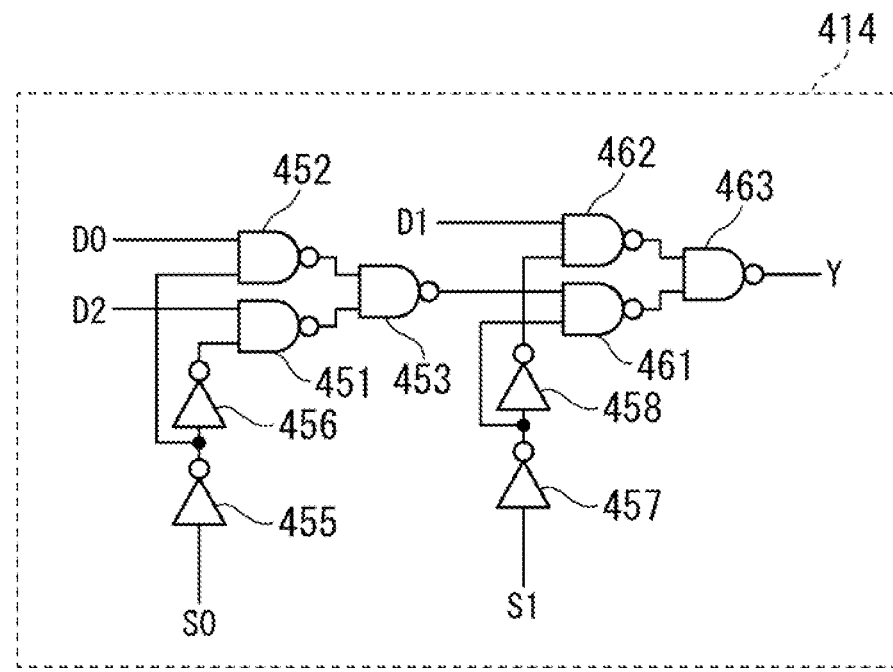
FIG. 16 is a diagram showing the structure of the selector in the data transmission system of the fourth embodiment.
Figure 17:
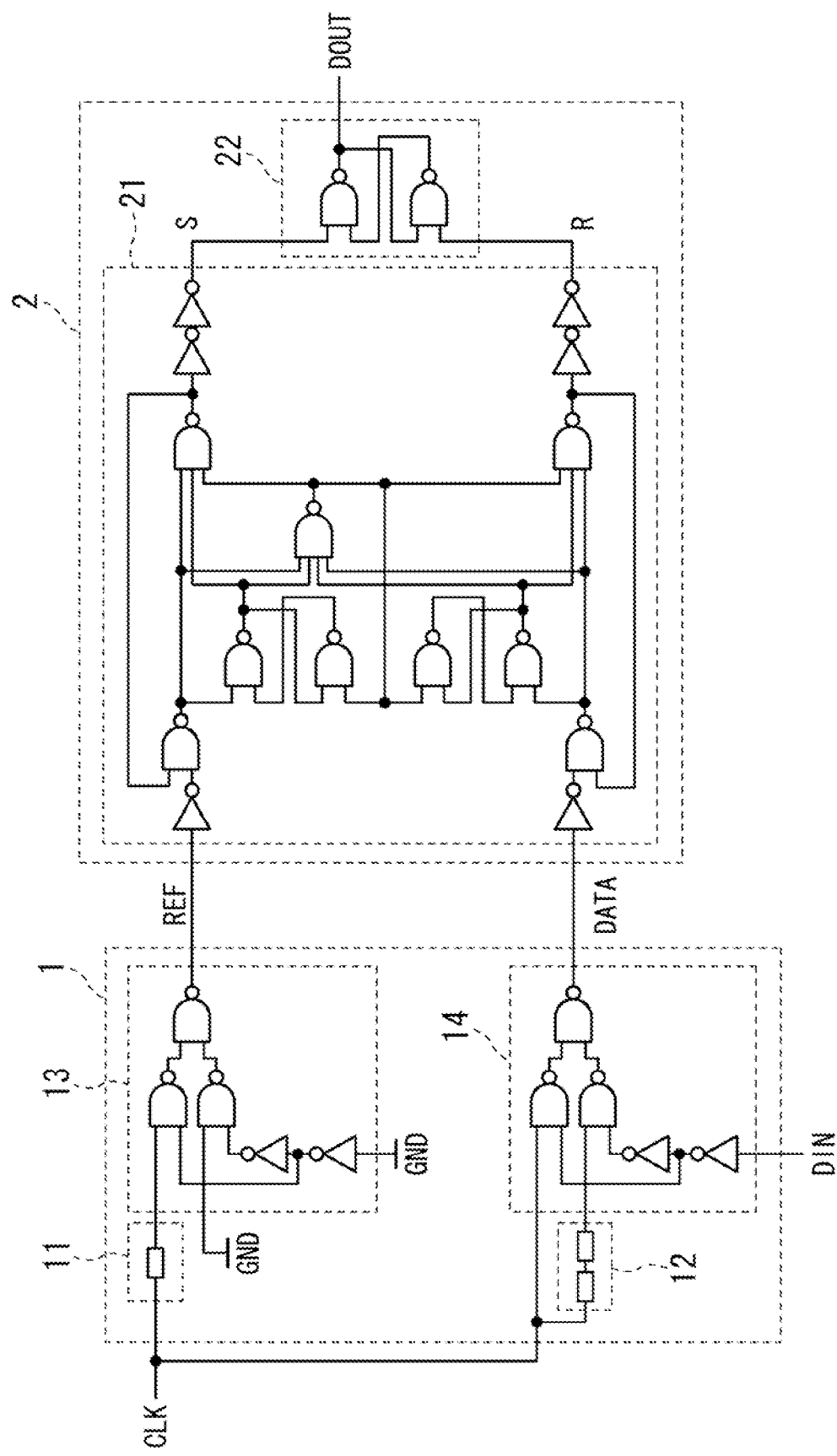
FIG. 17 is a block diagram showing an example of known data transmission systems.
Figure 18:
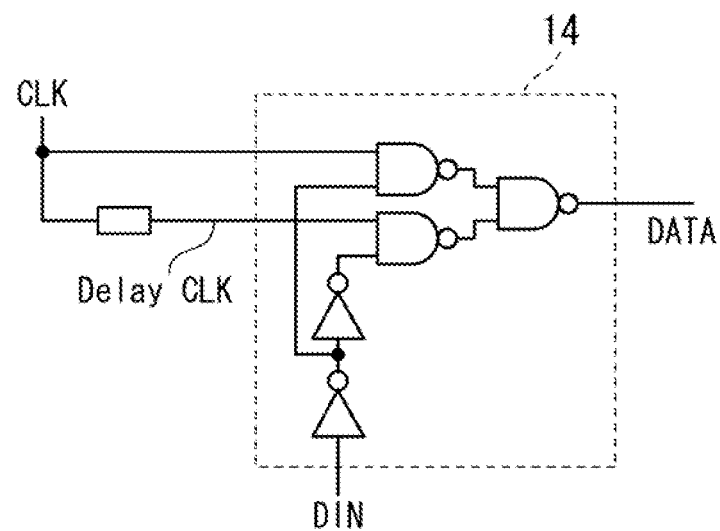
FIG. 18 is a diagram showing the structure of a multiplexer in the data transmission system of FIG. 17.
Figure 19:
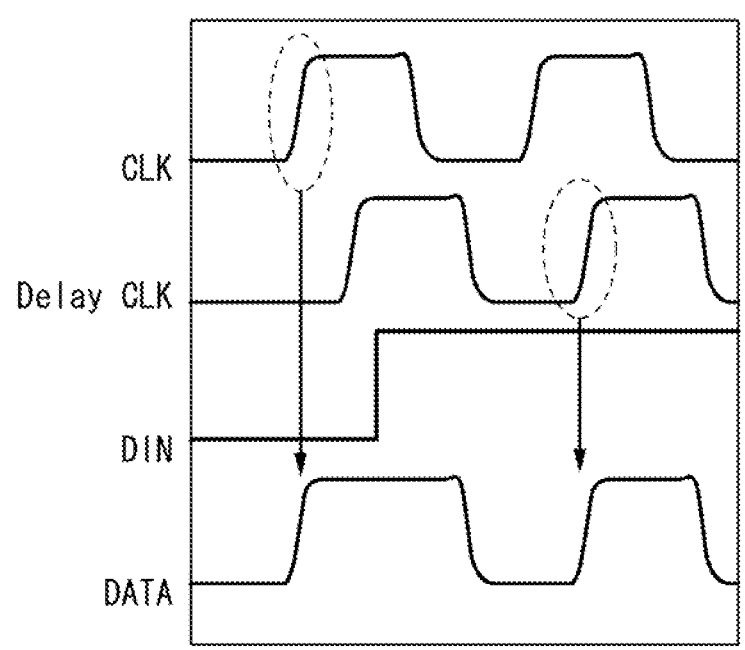
FIG. 19 is a timing chart for explaining the operation of the data transmission system of FIG. 17.
Figure 20:
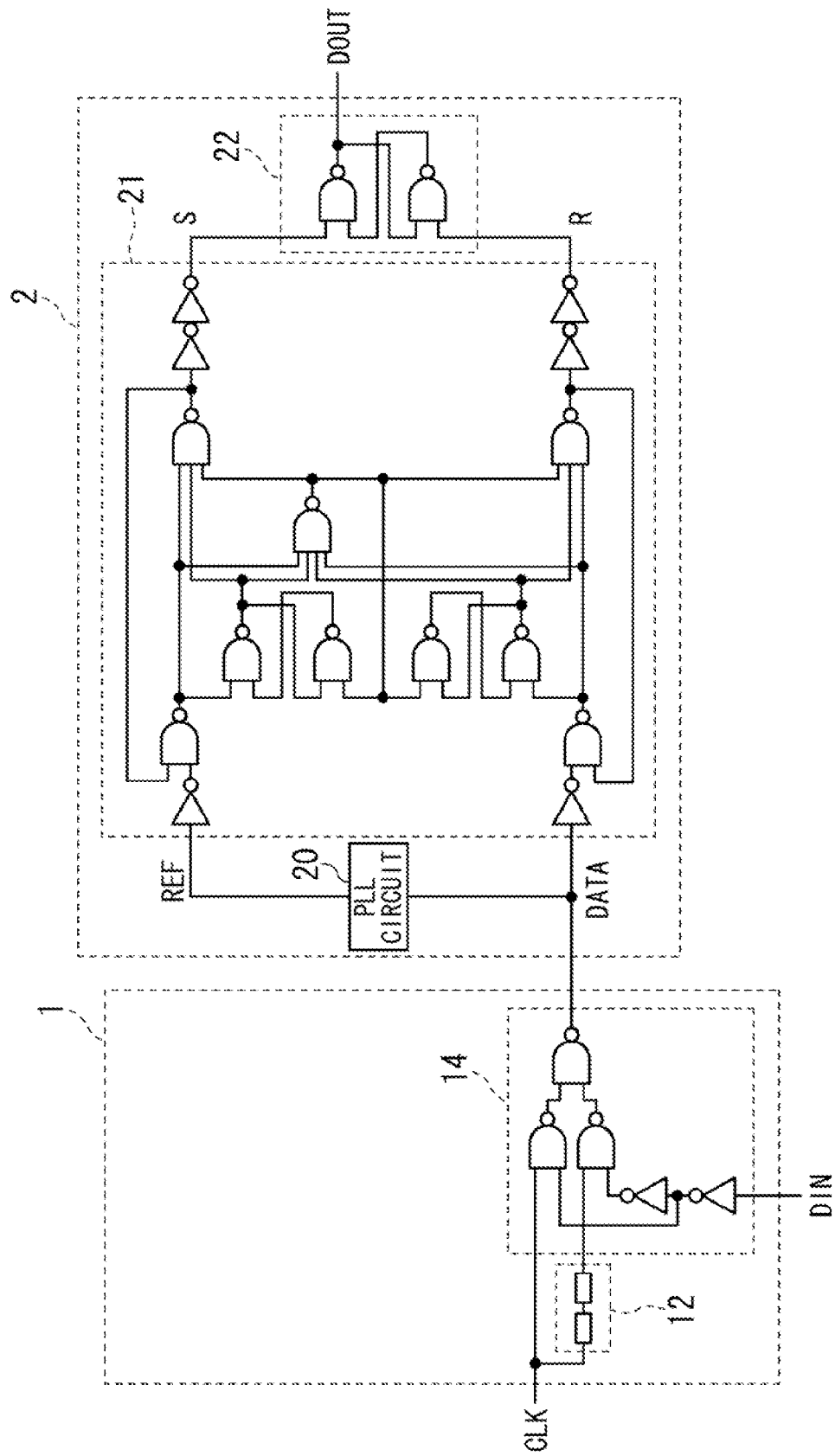
FIG. 20 is a block diagram showing another example of the known data transmission systems.

In the fourth embodiment, a truth table shown in FIG. 15 is assigned to the selector 414. As shown in FIG. 16, such a selector 414 can be formed using NAND gates 451 to 453, NAND gates 461 to 463, invertors 455 and 456, and invertors 457 and 458. However, the selector 414 may have any other circuit structure which can satisfy the truth table shown in FIG. 15.

The PLL circuit 421 of the data receiving apparatus 402 generates the reference signal by using the rising edge of the reception data. The data reproduction circuit 322 measures a phase difference in the falling edge of the relevant data and reproduces the data in accordance with the measured result, where the third embodiment and the fourth embodiment have opposite relationships for the phase and reproduced sign.

While preferred embodiments of the present invention have been described and illustrated above, it should be understood that these are exemplary embodiments of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A data transmission system comprising:
    a device that delays a signal having a predetermined base frequency so as to generate a reference-phase signal having a reference phase, a delay signal which is more delayed than the reference signal by a predetermined unit of time, and an advance signal which is more advanced than the reference signal by the unit of time;
    a device that selects one of the reference-phase signal, the delay signal, and the advance signal so as to output a data signal in which a phase of one of the rising edge and the falling edge of the data signal varies in accordance with values of transmitted data, and a phase of the other of the rising and falling edges is constant;
    a device that generates a reference signal at the timing of one of the rising edge and the falling edge of the data signal, said one having the constant phase; and
    a device that reproduces the data by measuring a phase difference between the generated reference signal and the data signal at the timing of the other of the rising and falling edges which has the varying phase.

2. The data transmission system in accordance with claim 1, wherein values "0" and "1" of the transmitted data are respectively associated with the advance and delay of the edges whose phases vary.

3. The data transmission system in accordance with claim 1, wherein values "1" and "0" of the transmitted data are respectively associated with the advance and delay of the edges whose phases vary.

4. The data transmission system in accordance with claim 1, wherein in the data signal, the edge whose phase varies is followed by the edge whose phase is constant.

5. The data transmission system in accordance with claim 1, wherein in the data signal, the edge whose phase is constant is followed by the edge whose phase varies.

6. A data transmission method comprising:
    a step that delays a signal having a predetermined base frequency so as to generate a reference-phase signal having a reference phase, a delay signal which is more delayed than the reference signal by a predetermined unit of time, and an advance signal which is more advanced than the reference signal by the unit of time;
    a step that selects one of the reference-phase signal, the delay signal, and the advance signal so as to output a data signal in which a phase of one of the rising edge and the falling edge of the data signal varies in accordance with values of transmitted data, and a phase of the other of the rising and falling edges is constant;
    a step that generates a reference signal at the timing of one of the rising edge and the falling edge of the data signal, said one having the constant phase; and
    a step that reproduces the data by measuring a phase difference between the generated reference signal and the data signal at the timing of the other of the rising and falling edges which has the varying phase.

7. A data sending apparatus comprising:
    a delay circuit that delays a signal having a predetermined base frequency so as to generate a reference-phase signal having a reference phase, a delay signal which is more delayed than the reference signal by a predetermined unit of time, and an advance signal which is more advanced than the reference signal by the unit of time; and
    a selector that selects one of the reference-phase signal, the delay signal, and the advance signal so as to output a data signal in which a phase of one of the rising edge and the falling edge of the data signal varies in accordance with values of transmitted data, and a phase of the other of the rising and falling edges is constant, where a data receiving side generates a reference signal using the constant phase.

8. A data receiving apparatus for receiving a data signal in which a phase of one of the rising edge and the falling edge of the data signal varies in accordance with values of data, and a phase of the other of the rising and falling edges is constant, wherein:
    the data signal is a signal output based on three signals which are generated by delaying a signal having a predetermined base frequency and are a reference-phase signal having a reference phase, a delay signal which is more delayed than the reference signal by a predetermined unit of time, and an advance signal which is more advanced than the reference signal by the unit of time;
    the apparatus comprises:
    a PLL circuit that generates a reference signal at the timing of one of the rising edge and the falling edge of the data signal, said one having the constant phase; and
    a data reproduction circuit that reproduces the data by measuring a phase difference between the generated reference signal and the data signal at the timing of the other of the rising and falling edges which has the varying phase.

* * * * *